United States Patent
Jones et al.

(10) Patent No.: US 10,317,424 B2
(45) Date of Patent: Jun. 11, 2019

(54) METHOD, SYSTEM AND COMPUTER PROGRAM FOR DETERMINING THE ORIENTATION OF AN APPARATUS

(71) Applicant: Redtail Telematics Limited, Great Chesterford (GB)

(72) Inventors: Kevin Jones, Haverhill (GB); Peter Massam, Saffron Walden (GB)

(73) Assignee: Redtail Telematics Limited, Great Chesterford (GB)

( * ) Notice: Subject to any disclaimer, the term of this patent is extended or adjusted under 35 U.S.C. 154(b) by 516 days.

(21) Appl. No.: 14/928,187

(22) Filed: Oct. 30, 2015

(65) Prior Publication Data

US 2016/0047836 A1 Feb. 18, 2016

Related U.S. Application Data (63) Continuation of application No. PCT/GB2014/051379, filed on May 2, 2014.

(30) Foreign Application Priority Data

May 2, 2013 (GB) .................................. 1307974.4

(51) Int. Cl.
*G01P 15/00* (2006.01)
*G01C 21/16* (2006.01)
(Continued)

(52) U.S. Cl.
CPC ............ *G01P 15/00* (2013.01); *G01C 21/165* (2013.01); *G01C 25/005* (2013.01); *G07C 5/085* (2013.01)

(58) Field of Classification Search
None
See application file for complete search history.

(56) References Cited

U.S. PATENT DOCUMENTS

2007/0294033 A1 12/2007 Osentoski et al.
2008/0252487 A1* 10/2008 McClellan ............ G01S 5/0027
340/936
(Continued)

FOREIGN PATENT DOCUMENTS

WO 2013049819 A1 4/2013
WO 2014177888 A1 11/2014

OTHER PUBLICATIONS

International Search Report and Written Opinion dated Sep. 4, 2014 for PCT Application No. PCT/GB2014/051379.

(Continued)

*Primary Examiner* — John E Breene
*Assistant Examiner* — Jeffrey C Morgan
(74) *Attorney, Agent, or Firm* — EIP US LLP (57) ABSTRACT

A method, system and computer program for determining the orientation of an apparatus relative to a vehicle in which the apparatus is installed is disclosed. Acceleration data of the apparatus along three mutually orthogonal axes at a first time interval is recorded (100). Speed and heading data of the apparatus at a second time interval is recorded (100). A first vector which corresponds to the direction of gravity is determined (102) using the acceleration data. One or more periods of acceleration in a substantially straight line are identified (104) using the speed and heading data. Acceleration data corresponding to the identified one or more periods of acceleration in a substantially straight line is selected (106). A second vector which is orthogonal to the first vector and which corresponds to a forward direction of the vehicle is determined (110) using the selected acceleration data.

16 Claims, 6 Drawing Sheets

(51) Int. Cl.
*G01C 25/00* (2006.01)
*G07C 5/08* (2006.01)

(56) References Cited

U.S. PATENT DOCUMENTS

| | | |
|---|---|---|
| 2009/0051510 A1 | 2/2009 | Follmer et al. |
| 2011/0202225 A1 | 8/2011 | Willis et al. |
| 2012/0253585 A1 | 10/2012 | Harvie |
| 2013/0081442 A1 | 4/2013 | Basir et al. |

OTHER PUBLICATIONS

GB Search Report dated Nov. 1, 2013 for GB Application No. GB1307974.4.
"A tutorial on Principal Components Analysis", Lindsay I. Smith, Cornell University, USA Feb. 26, 2002 http://www.cs.otago.ac.nz/cosc453/student_tutorials/principal_components.pdf.

* cited by examiner

METHOD, SYSTEM AND COMPUTER PROGRAM FOR DETERMINING THE ORIENTATION OF AN APPARATUS

CROSS-REFERENCE TO RELATED APPLICATIONS

This application is a continuation of International Application No. PCT/GB2014/051379, filed May 2, 2014, which claims the benefit of Foreign Application No. GB1307974.4, filed May 2, 2013. Each of the above-referenced patent applications is incorporated by reference in its entirety.

BACKGROUND OF THE INVENTION

Field of the Invention

The present invention relates to a method, system and computer program for determining the orientation of an apparatus attached to a vehicle.

Description of the Related Technology

It is known to provide tracking devices for installation in or on vehicles. The tracking device can include a positioning system, such as a satellite positioning system such as a Global Positioning System (GPS) receiver or the like, and a transmitter for reporting data to a control center. In addition to the GPS or other receiver, the vehicle may also have an accelerometer. In some cases, the accelerometer may be a component of the tracking device.

Data from an accelerometer can be used for various purposes, for example to provide information on driving style or to detect when a vehicle is in a collision. However, the accelerometer axes are very unlikely to be aligned with the axes of the vehicle. For example, to simplify installation an accelerometer, or a tracking device including an accelerometer, can be installed in a variety of positions and orientations with respect to a vehicle with little or no regard to the orientation of the accelerometer relative to the vehicle.

It would be desirable for the accelerometer data to be expressed in terms of the vehicle frame of reference, rather than the accelerometer axes (which relate to the orientation of the accelerometer).

US2009/051510A1 relates to a system and method for detecting and reporting vehicle damage. A monitoring unit can include an accelerometer module with a tri-axial accelerometer. A self-orienting application is started after installation to determine the mounting position of the unit and how to compensate for it. First a gravity vector is determined by observing the forces on the accelerometers due to gravity when the vehicle is stopped. US2009/051510A1 then assumes that when a vehicle begins to move or is braking the vehicle is usually traveling in a straight line along the center line of the vehicle. By measuring acceleration or braking, a center line orientation can be determined.

SUMMARY

According to a first embodiment, there is provided a method for determining the orientation, relative to a vehicle, of an apparatus attached to the vehicle. The method comprises: periodically recording acceleration data of the apparatus along three mutually orthogonal axes at a first time interval; periodically recording speed and heading data of the apparatus at a second time interval; determining a first vector which corresponds to the direction of gravity using the acceleration data; identifying one or more periods of acceleration in a substantially straight line using the speed and heading data; selecting acceleration data corresponding to the identified one or more periods of acceleration in a substantially straight line; and determining a second vector which is orthogonal to the first vector and which corresponds to a forward direction of the vehicle using the selected acceleration data.

According to another embodiment, there is provided a system for determining the orientation, relative to a vehicle, of an apparatus attached to the vehicle. The system comprises a processing system configured to: store periodic acceleration data of the apparatus along three mutually orthogonal axes at a first time interval; store periodic speed and heading data of the apparatus at a second time interval; determine a first vector which corresponds to the direction of gravity using the acceleration data; identify one or more periods of acceleration in a substantially straight line using the speed and heading data; select acceleration data corresponding to the identified one or more periods of acceleration in a substantially straight line; and determine a second vector which is orthogonal to the first vector and which corresponds to a forward direction of the vehicle using the selected acceleration data.

In another embodiment, there is provided an apparatus for attachment to a vehicle. The apparatus comprises: an accelerometer interface for acceleration data from an accelerometer; a positioning and heading interface for speed and heading data; a transmitter for transmission of the acceleration data and the speed and heading data; a receiver for reception of orientation data of the accelerometer relative to the vehicle; non-volatile storage configured to store the orientation data; and a processing system configured to use stored orientation data in the non-volatile storage to convert the acceleration data into a reference frame of the vehicle.

According to another embodiment, there is provided a computer program comprising instructions such that when the computer program is executed on a computing device, the computing device is arranged to determine the orientation, relative to a vehicle, of an apparatus attached to the vehicle using the method of the above described first embodiment.

Further features and advantages of the invention will become apparent from the following description of embodiments of the invention, given by way of example only, which is made with reference to the accompanying drawings.

DETAILED DESCRIPTION OF CERTAIN INVENTIVE EMBODIMENTS

According to a first embodiment, there is provided a method for determining the orientation, relative to a vehicle, of an apparatus attached to the vehicle. The method comprises: periodically recording acceleration data of the apparatus along three mutually orthogonal axes at a first time interval; periodically recording speed and heading data of the apparatus at a second time interval; determining a first vector which corresponds to the direction of gravity using the acceleration data; identifying one or more periods of acceleration in a substantially straight line using the speed and heading data; selecting acceleration data corresponding to the identified one or more periods of acceleration in a substantially straight line; and determining a second vector which is orthogonal to the first vector and which corresponds to a forward direction of the vehicle using the selected acceleration data.

The first vector and second vector are expressed in terms of the accelerometer coordinates, i.e. in terms of the frame of reference of the apparatus attached to the vehicle and can therefore be used to convert from the frame of reference of the apparatus to the frame of reference of the vehicle.

The first and second time interval can be the same or different. For example, in some embodiments the acceleration data may be recorded at a shorter time interval than the speed and heading data. In other words in some embodiments the acceleration data can be recorded at a higher frequency than the speed and heading data. The first time interval and the second time interval can be the same as or different from the intervals at which the data is provided. For example, speed and heading data may be provided once per second (at a frequency of 1 Hz) in some embodiments and every data item recorded. In another example, accelerometer data may be provided more frequently than it is recorded. For example, a value may be recorded every 100 ms (a frequency of 10 Hz) even though it is provided every 10 ms (a frequency of 100 Hz); in this case increasing the period at which the acceleration data is recorded reduces the data volume. The invention is not limited to these examples, for example other embodiments may be provided with acceleration data at a frequency of 1 kHz or higher, The speed and heading data can be in any form which expresses the magnitude of speed and the direction of travel. For example, it can be a separate speed and associated heading or expressed as a velocity vector.

In some embodiments the first vector can be calculated from the arithmetic mean of the acceleration data. In that case at least some of the acceleration data may have been collected while the vehicle was in motion. In some embodiments all acceleration data which has been recorded can be used to calculate the first vector. It has been found that including data from when the vehicle is in motion can determine the first vector more accurately than when only stationary data is used. It has been found that if only stationary data is used, then the first vector may be less accurate because of any camber or slope in the road surface. The first vector corresponds to the direction of gravity but does not have to have the same sign, for example the first vector can be expressed as a downwards acceleration (towards the center of the Earth) or an upwards acceleration (away from the center of the Earth).

The one or more periods of acceleration in a straight line can be identified from consecutive speed and heading data with substantially the same heading and increased speed. By limiting the selection to consecutive data with increased speed, only vehicle acceleration is considered, not vehicle deceleration or braking. As a result the second vector corresponds to a forward direction of the vehicle. Substantially the heading can mean the same bearing, when the bearing is expressed to the nearest degree or few degrees, such as 2 to 5 degrees, for example. This can be useful when the bearing is provided by a satellite positioning receiver, which may provide heading data as a bearing to the nearest whole degree or few degrees for example. If the bearing data is provided to greater accuracy than the nearest whole degree, the bearing data can be rounded to be expressed in whole degrees. In other embodiments different criteria can be used to determine whether a bearing is substantially the same, for example if a bearing is within a specified percentage of another, for example within a few percent, such as 1% or 2%, of the previous bearing.

A period of acceleration in a straight line may have a first speed and heading datum and a second speed and heading datum. In an example, the second datum is later than and consecutive to the first datum, both the first and the second datum have substantially the same heading and the second datum has a greater speed than the first datum.

In some embodiments, determining the second vector can comprise: projecting the selected acceleration data onto a plane normal to the first vector; and using principal components analysis to determine a principal component vector of the projected selected acceleration data, wherein the second vector is the principal component vector.

When principal components analysis is used, the method can comprise calculating a quality value as an indicator of the accuracy of the second vector, wherein the calculation of the quality value uses the dot product of the second vector with the projected values of the selected acceleration data on the plane normal to the first vector. This can allow the accuracy of the second vector to be determined when both positive and negative acceleration data is selected for use in the principal components analysis.

The speed and heading data may be from a satellite positioning system receiver, or other means such as an electronic compass or vehicle on board data network. This allows speed and heading data to be received without requiring any additional processing. Any suitable positioning system can be used including, but not limited to GPS, GLONASS, Galileo or a combination of two or more positioning systems. In some embodiments, the heading may be expressed in three dimensions, for example as a three dimensional vector, or by using the GPS height data to determine a change in height.

The accuracy of the method is improved given a larger dataset to work from. In some embodiments, the acceleration data and speed and heading data can be recorded for a period of at least 1 km before subsequent steps of the method are carried out. Other embodiments can record data for a different time period, for example, at least 10 km, at least 20 km, at least 50 km, at least 100 km or another distance. The size of data set needed for good accuracy may vary with the terrain, for example substantially flat terrain generally requires a smaller data set than hilly or mountainous terrain. The distance travelled can be determined by, for example, data of the total distance travelled. Data on the total distance travelled can be recorded using data from a satellite positioning receiver, such as a GPS receiver or the like, or derived from information received from a vehicle interface, such as odometer information broadcast on a CANBus, or derived from the accelerometer or speed data using dead reckoning.

In some embodiments a third vector which is orthogonal to the first and second vector and which corresponds to a sideways direction of the vehicle is determined using the first vector and the second vector. This enables the accelerometer data to be transformed more completely into the vehicle's frame of reference.

The method of the invention can be performed on the apparatus itself or remotely. For example, in one embodiment the method can be performed at a server, remote from the apparatus, and the method then comprises:

receiving, at the server, the acceleration data and the speed and heading data from the apparatus; and transmitting, by the server, the first vector and the second vector to the apparatus.

According to another embodiment, there is provided a system for determining the orientation, relative to a vehicle, of an apparatus attached to the vehicle. The system comprises a processing system configured to: store periodic acceleration data of the apparatus along three mutually orthogonal axes at a first time interval; store periodic speed and heading data of the apparatus at a second time interval; determine a first vector which corresponds to the direction of gravity using the acceleration data; identify one or more periods of acceleration in a substantially straight line using the speed and heading data; select acceleration data corresponding to the identified one or more periods of acceleration in a substantially straight line; and determine a second vector which is orthogonal to the first vector and which corresponds to a forward direction of the vehicle using the selected acceleration data.

The one or more periods of acceleration in a straight line may be identified from consecutive speed and heading data with substantially the same heading and increased speed. For example, the one or more periods of acceleration in a straight line may be identified from consecutive speed and heading data which have the same bearing, expressed to the nearest degree.

The processing system can be configured to determine the second vector by: projecting the selected acceleration data onto a plane normal to the first vector; and using principal components analysis to determine a principal component vector of the projected selected acceleration data, wherein the second vector is the principal component vector.

The processing system may be configured to determine a third vector which is orthogonal to the first and second vector and which corresponds to a sideways direction of the vehicle using the first vector and the second vector.

The processing system may be configured to record acceleration data and to record speed and heading data until the vehicle has travelled at least 1 km before determining the first or second vector.

In some embodiments, the apparatus can comprise an accelerometer interface for the acceleration data; and a positioning interface for speed and heading data. The accelerometer interface can be connected to an external accelerometer, alternatively an accelerometer can be provided with the apparatus itself. The positioning interface can be connected to an on-board diagnostic system, for example being provided vehicle speed and heading over a CANBus. The positioning interface can also be connected to a satellite positioning receiver provided within the apparatus.

The processing system can be local to the apparatus or remote from the apparatus. For example, the system can comprise a server, wherein the server is remote from the apparatus attached to the vehicle and wherein the server comprises: the processing system; and a receiver configured to receive the acceleration data and the speed and heading data from the apparatus. The server may comprise a transmitter and the processing system may then be configured to transmit the first vector and the second vector to the apparatus using the transmitter.

In another embodiment, there is provided an apparatus for attachment to a vehicle. The apparatus comprises: an accelerometer interface for acceleration data from an accelerometer; a positioning and heading interface for speed and heading data; a transmitter for transmission of the acceleration data and the speed and heading data; a receiver for reception of orientation data of the accelerometer relative to the vehicle; non-volatile storage configured to store the orientation data; and a processing system configured to use stored orientation data in the non-volatile storage to convert the acceleration data into a reference frame of the vehicle.

In this embodiment, the apparatus can convert the accelerometer output into the reference frame of the vehicle to which it is attached using stored orientation data. However, the orientation data is not calculated locally but is determined remotely from the apparatus. This can allow use of a larger dataset or faster processing because the memory and processing constraints of the apparatus will not apply. The orientation data can be provided as vectors expressing the vehicle axes in terms of the accelerometer axes. Conversion then requires relatively little processing in the apparatus itself.

According to another embodiment of the present invention, there is provided a computer program comprising instructions such that when the computer program is executed on a computing device, the computing device is arranged to determine the orientation, relative to a vehicle, of an apparatus attached to the vehicle by: periodically recording acceleration data of the apparatus along three mutually orthogonal axes at a first time interval; periodically recording speed and heading data of the apparatus at a second time interval; determining a first vector which corresponds to the direction of gravity using the acceleration data; identifying one or more periods of acceleration in a substantially straight line using the speed and heading data; selecting acceleration data corresponding to the identified one or more periods of acceleration in a substantially straight line; and determining a second vector which is orthogonal to the first vector and which corresponds to a forward direction of the vehicle using the selected acceleration data.

The processing system described above may comprise at least one processor and a memory storing a set of computer instructions.

There may be provided a non-transitory computer-readable storage medium storing a computer program as described above.

Figure 1:
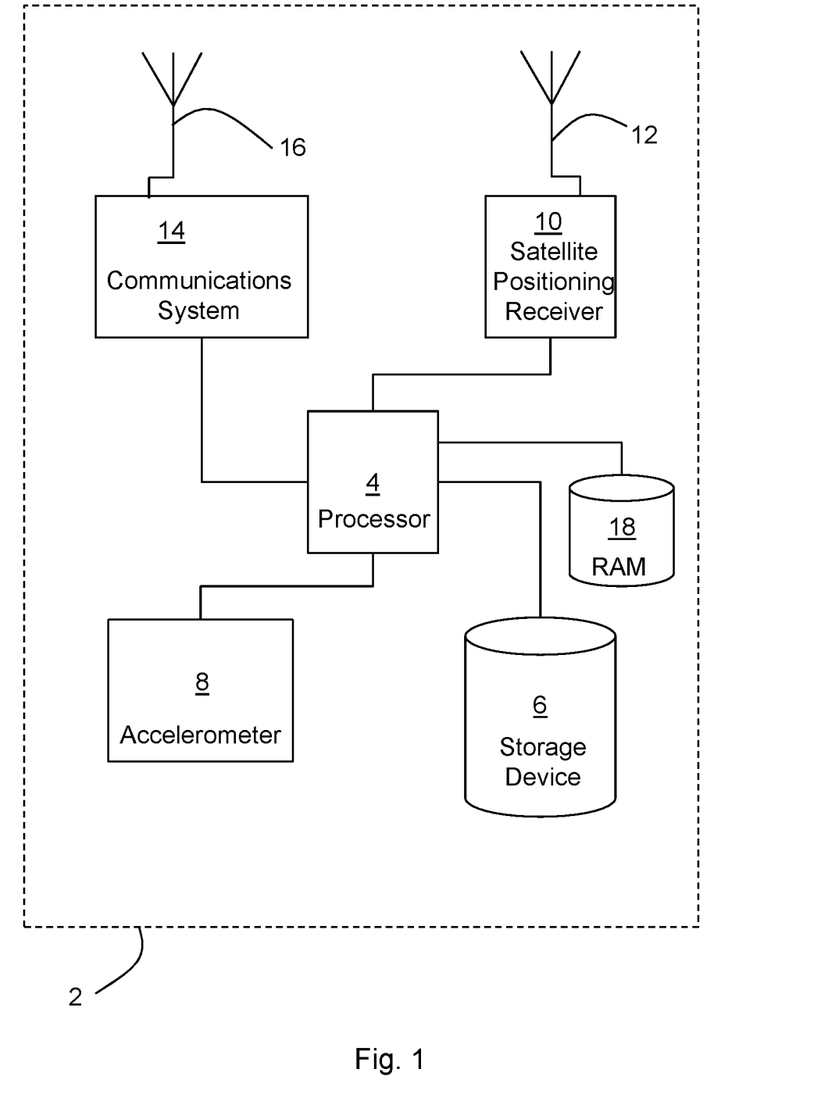
FIG. 1 shows a diagrammatic representation of a schematic diagram of a monitoring apparatus for attachment to a vehicle.

FIG. 1 shows a diagrammatic representation of a schematic diagram of a monitoring apparatus in which embodiments of the present invention can be implemented, or which can form part of a system according to embodiments of the invention.

The monitoring apparatus 2 of FIG. 1 comprises a processor 4, storage 6, accelerometer 8, satellite positioning receiver 10, satellite positioning antenna 12, wireless communication system 14, wireless communication antenna 16 and RAM 18.

Processor 4 can be any device able capable of executing instructions, for example a microprocessor, microcontroller or application-specific integrated circuit. The processor is connected to the storage 6, accelerometer 8, satellite positioning receiver 10, wireless communication system 14 and RAM 18 by respective interfaces, allowing the processor 4 to transfer data with the storage 6, accelerometer 8, satellite positioning receiver 10 and wireless communication system 14.

Storage 6 can be any non-volatile or persistent storage that retains data stored in it when no power is applied. Examples include one or more Flash memory devices and magnetic storage, such as one or more hard disk drives. Storage 6 stores computer-implementable instructions that can be read and executed by the processor 4. Storage 6 also stores configuration parameters and other information. In some embodiments the storage 6 can also be used to record data from the accelerometer and satellite positioning system.

The accelerometer 8 is an acceleration sensor that outputs instantaneous acceleration along at least one axis. In this embodiment the acceleration sensor is a three-axis acceleration sensor which outputs instantaneous acceleration along three, mutually orthogonal axes. In other embodiments acceleration in three axes can be provided by three separate acceleration sensors oriented orthogonally to each other. The accelerometer 8 provides the processor 4 with instantaneous acceleration measurements at a constant frequency. For example the accelerometer provides the processor 4 with acceleration measurements at a frequency of 100 Hz in some embodiments. In other embodiments an accelerometer can be provided which is external to the monitoring apparatus; in that case an acceleration data interface may be provided to the processor 4 to receive data from the external accelerometer.

Satellite positioning receiver 10 provides speed and heading to the processor 4 at a constant frequency. Any form of satellite positioning can be used, for example GPS, GLONASS or Galileo. In this embodiment the satellite positioning receiver receives positioning satellite signals via the antenna 12 and outputs signals corresponding to position, speed and heading data to the processor 4 at a frequency of 1 Hz. In other embodiments, the satellite positioning receiver 10 and internal positioning antenna 12 may be replaced with a positioning interface to the processor 4 which receives speed, position and heading data from an external source, such as an in-vehicle navigation system.

Wireless communication system 14 and its associated antenna 16 enable the processor to communicate wirelessly with other devices. For example, data from the accelerometer 8 and satellite positioning receiver 10 can be transmitted using the wireless communication system 14. Any suitable wireless communication system can be used. However, it is preferred to use a system with good geographical coverage. In this embodiment the wireless communication system 10 is a GSM communication system. It can transmit and/or receive data using wireless data connections and/or SMS messages, depending on the volume and type of data required to be transmitted. Other embodiments can use other types of wireless communication systems, for example ones following standards defined by 3GPP, such as so called 3G, Long Term Evolution or Long Term Evolution-Advanced. Other embodiments can use CDMA, satellite communication, VHF radios and other wireless communication systems.

In normal operation, the processor 4 receives accelerometer data from accelerometer 8 at 100 Hz and speed and heading data from the satellite positioning system 10 at 1 Hz. In other embodiments the acceleration data and speed and heading data can be received at different rates, for example at higher rates. This data is stored in a buffer in RAM 18 or storage 6 until the buffer is full. When the buffer is full the data is transmitted using the wireless transmission system 14 for external storage and processing.

Some embodiments reduce the volume of data for transmission and storage by not recording all the data provided to the processor. For example, the accelerometer can be recorded at a rate of 10 Hz. In such embodiments the data can be reduced in any suitable way. For example some data can simply be discarded or an average of several values stored. Other embodiments can record data at different rates.

Figure 2:
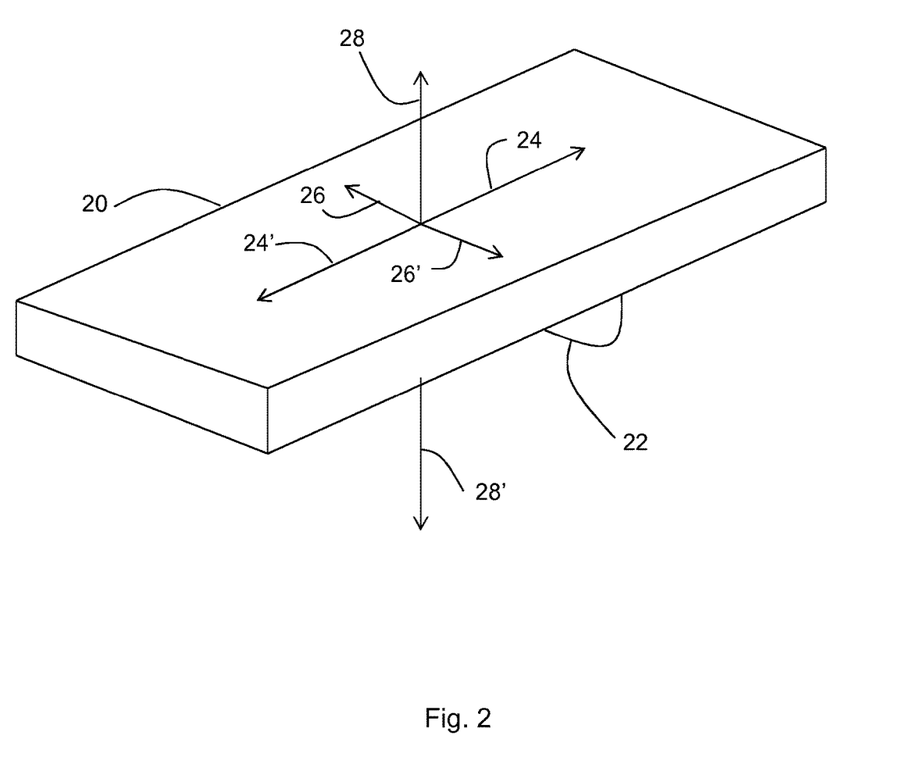
FIG. 2 shows a diagrammatic representation of an external view of accelerometer axes in the frame of reference of the vehicle.

FIG. 2 is a diagrammatic representation of housing 20 for an accelerometer that can be used in embodiments of the invention. In some embodiments the housing 20 may also contain the other components of the monitoring apparatus described above with reference to FIG. 1. The housing 20 is cuboidal in this embodiment but can have any other suitable shape in other embodiments. The housing is provided with attachment or fixation elements 22, which is a protrusion defining a hole for a mounting screw or nut in this embodiment. Alternative fixation elements can also be provided (in addition to or in replacement of fixation element 22), examples including a hook and loop fastener and adhesive. The accelerometer 8 is mounted so that it measures acceleration along the orthogonal axes 24, 26, 28 shown in FIG. 2. The negative direction along the axes is denoted by the signs 24', 26', 28'.

In use, the monitoring apparatus is mounted in or on a vehicle, for example within a passenger compartment or within an engine compartment. The large variety of different vehicles and potential mounting locations make it difficult to install the accelerometer 8 so that the accelerometer axes 24, 26, 28 are aligned with the vehicle axes. While accelerometers provide useful information in any orientation, it is desirable to know the acceleration in terms of the vehicle axes. Embodiments of the invention enable the orientation of the accelerometer 8 relative to a vehicle axis to be determined, so that the accelerometer data can be expressed in terms of the vehicle axes rather than the accelerometer axes (which in general are not aligned with the vehicle axes).

An embodiment of a method for determining the orientation of an apparatus relative to a vehicle will now be described. As discussed above, in an example the monitoring apparatus includes a three-axis accelerometer 8, which may be provided integrally with the other components of the monitoring apparatus or separately therefrom. The accelerometer 8 in particular may be installed into a vehicle in any orientation, either known or unknown. A method to convert all of the accelerometer measurements from the axes 24, 26, 28 into the vehicle frame of reference will now be described, such that the converted measurements represent the forwards, sideways and downwards acceleration relative to the vehicle's axes. The problem is complicated by the various forces acting on the vehicle, which are discussed below. Throughout the following discussion, the conversion from acceleration in meters per second to acceleration in g is to divide by 9.8 ms-2.

In the vehicle's downwards direction, there is constant force acting on the vehicle towards Earth, which is measured by the accelerometer as an upwards acceleration. This acceleration is, by definition, 1 g (9.8 ms-2) pointing away from the center of the Earth. As a constant acceleration, this will be present in all measurements taken from the accelerometer.

In the vehicle forwards direction, linear acceleration is given by the following formula:

$$accel = \frac{\Delta v}{\Delta t} \quad (1)$$

As a specific example, a typical forwards acceleration might be from stationary to 60 mph (26.82 ms$^{-1}$) in around 10 seconds yielding an acceleration of 2.68 ms$^{-2}$ which is equivalent to 0.27 g. Likewise, as a specific example, a typical forwards deceleration might be from 60 mph (26.82 ms$^{-1}$) to stationary in around 2 seconds yielding a deceleration of 13.41 ms$^{-2}$ which is equivalent to 1.37 g.

In the vehicle sideways direction, angular acceleration is given by the following formula:

$$accel = \frac{v^2}{r} \quad (2)$$

As a specific example, a typical sideways acceleration might be at a roundabout of radius of around 10 m and a speed of around 20 mph (8.94 ms$^{-1}$) yielding an acceleration of 7.993 ms$^{-2}$ which is equivalent to 0.82 g.

It therefore can be seen that finding the forwards acceleration from a set of measurement data taken from a monitoring apparatus with an unknown orientation is a non-trivial problem because the accelerations due to Earth, linear velocity changes and angular velocity changes are in general all of the same order of magnitude.

An example of a method of determining the orientation of the monitoring apparatus, or of the accelerometer 8 in particular, will now be explained with reference to FIG. 3. First, before the orientation can be determined, data from the accelerometer 8 and positioning system 10 is collected. The larger the data set the more accurate the determination of orientation. At step 100 acceleration data is recorded at a first time interval (for example every 100 ms, corresponding to a frequency of 10 Hz) and speed and heading data is recorded at a second time interval (for example every second, corresponding to a frequency of 1 Hz). Once sufficient data has been recorded, execution proceeds to step 102 to begin processing the data to determine the orientation.

At step 102 the upwards direction or "Earth" vector is determined. The Earth vector is defined as a unit vector pointing in the upwards direction away from Earth expressed in terms of the accelerometer axes 24, 26, 28. As discussed above, the Earth imposes a 1 g force on the vehicle which appears as a 1 g acceleration to the accelerometer 8. The Earth vector is determined by finding the arithmetic average for all acceleration data recorded. That average is then converted to a unit vector.

Next, the forward acceleration vector is determined. This requires the effect of sideways acceleration discussed above to be removed. This is achieved by finding the set of acceleration data which is subject to only forwards acceleration (i.e. positive acceleration in the forwards direction). The speed and heading data is used for this; at step 104 substantially straight accelerations are identified from the GPS information. At step 106 the acceleration data associated with the straight accelerations is selected. One way to achieve this is by applying the following rule.

if GPS heading at sample n is the same as the GPS heading at sample n−1 and the GPS speed at sample n greater than to the GPS speed at sample n−1 then keep the acceleration measurements taken between GPS sample n−1 and GPS sample n. (A heading is the same if it is in the same direction, expressed as a whole number of degrees.)

As discussed above the satellite positioning system provides heading and speed data which is recorded at a frequency of 1 Hz. The accelerometer data is recorded at a frequency of 10 Hz. (Different recording frequencies can be used in other embodiments.) Therefore, in this embodiment, ten accelerometer samples for each of the monitoring apparatus axes 24, 26, 28 are retained each time straight acceleration is identified.

Next, at step 108, the selected acceleration data is projected onto a plane normal to the upwards direction determined above in step 102. This is because the selected straight line acceleration data is still in a three dimensional space. The data is converted such that all data exists on a plane to remove the effect of gravity. A diagrammatic representation of the projection onto a plane is depicted in FIG. 4. A plane is mathematically described by a unit vector which is normal to the plane. In this implementation the Earth vector 30 identified in step 102 is used to define the plane 32. The defined plane is then effectively a localised flat surface which is perpendicular to the Earth vector 30 and so can be considered to be a mathematically flat road surface. All of the acceleration measurements 34 within the acceleration data are then projected onto the plane 32. The projection is illustrated by vector 36 in FIG. 4.

In the following discussion, vectors will be noted in terms of x, y and z axes. The x, y and z axes correspond to the axes 24, 26 and 28, respectively, of the accelerometer.

Given an Earth vector E(x,y,z) and an acceleration vector A(x,y,z) then the projection of the acceleration vector onto the plane which is perpendicular to the Earth vector is:

$$\begin{bmatrix} Px \\ Py \\ Pz \end{bmatrix} = \begin{bmatrix} 1-Ex^2 & -ExEy & -ExEz \\ -EyEx & 1-Ey^2 & -EyEz \\ -EzEx & -EzEy & 1-Ez^2 \end{bmatrix} \begin{bmatrix} Ax \\ Ay \\ Az \end{bmatrix} \quad (3)$$

This calculation is repeated for each data point or datum within the set of selected acceleration data corresponding to a straight line acceleration. The resulting vectors are two dimensional. However, because the plane is normal to the upwards direction they still have components in each of the accelerometer axes.

Figure 5:
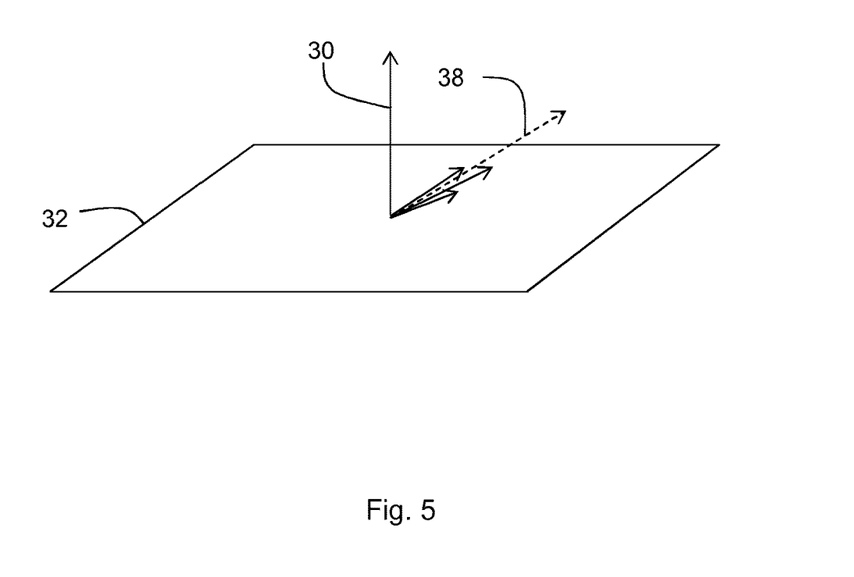
FIG. 5 is a diagrammatic representation of the results of principal components analysis for vectors projected onto a plane.

Next, at step 110, Principal Component Analysis (PCA) is applied to the two dimensional set of vectors which was created in step 108. Principal Component Analysis is a method that can be used to determine which single vector best describes the two dimensional set of vectors. Since the plane containing the vectors is perpendicular to the Earth vector, and since the set of vectors contains only straight line accelerations, then the principal component is the forwards vector. This is illustrated in FIG. 5, with the principal component illustrated at 38.

Principal Component Analysis is a mathematical technique known to the person skilled in the art. For example, the background and theory is described in "A tutorial on Principal Components Analysis", Lindsay I Smith, Feb. 26, 2002, herein incorporated by reference. A summary of Principal Components Analysis as applied to determine the forwards vector in this embodiment is given below.

First a covariance matrix is created. The components of the covariance matrix are the x, y and z components of the projected acceleration vectors relative to the accelerometer axes. The covariance matrix may be defined as follows:

$$C = \begin{bmatrix} \text{cov}(x,x) & \text{cov}(x,y) & \text{cov}(x,z) \\ \text{cov}(y,x) & \text{cov}(y,y) & \text{cov}(y,z) \\ \text{cov}(z,x) & \text{cov}(z,y) & \text{cov}(z,z) \end{bmatrix} \quad (4)$$

where:

$$\text{cov}(X,Y) = \frac{\sum_{i=1}^{n}(X_i - \overline{X})(Y_i - \overline{Y})}{n-1} \quad (5)$$

Statistics dictates that the divisor is "n" if the data set is a "population" (all possible samples) or "n−1" if the data set is a "sample" (subset of all possible samples).

The Eigen values and Eigen vectors of the covariance matrix are then calculated. In essence, if matrix A is n by n and matrix C is 1 by n then C is an Eigen vector of A if $AC=\lambda C$ where $\lambda$ is a scalar value. The value of $\lambda$ is an Eigen value. An n by n matrix has n Eigen values and n Eigen vectors. Mathematical development of this equation leads to the following:

$$\det(A - \lambda I_n) = 0 \quad (6)$$

Where "det" means the determinant and $I_n$ is the n-dimension unit or identity matrix. The journey orientation algorithm is based on a 3×3 covariance matrix so the expansion of the equation becomes:

$$\det\left(A - \lambda \begin{bmatrix} 1 & 0 & 0 \\ 0 & 1 & 0 \\ 0 & 0 & 1 \end{bmatrix}\right) = 0 \quad (7)$$

Or:

$$\det\left(A - \begin{bmatrix} \lambda & 0 & 0 \\ 0 & \lambda & 0 \\ 0 & 0 & \lambda \end{bmatrix}\right) = 0 \quad (8)$$

So if:

$$A = \begin{bmatrix} a & b & c \\ d & e & f \\ g & h & i \end{bmatrix} \quad (9)$$

Then the equation becomes:

$$\det\begin{bmatrix} a-\lambda & b & c \\ d & e-\lambda & f \\ g & h & i-\lambda \end{bmatrix} = 0 \quad (10)$$

The skilled person will be aware of several methods which find a general solution i.e. the three values of $\lambda$ (the Eigen values) to equation (10). At its simplest a solution can be found using existing algorithms or libraries that can be called to do the calculation. For example, Matlab commercially available from MathWorks includes functions to calculate Eigen values. While such solutions can be computationally complex, the solution is simplified in this case because all of the projected accelerometer data includes only real (not imaginary) numbers and because the problem is constrained to a 3×3 matrix.

Once the Eigen values have been determined then the Eigen vectors can be calculated from the following equation:

$$\begin{bmatrix} a-\lambda & b & c \\ d & e-\lambda & f \\ g & h & i-\lambda \end{bmatrix} \begin{bmatrix} x \\ y \\ z \end{bmatrix} = 0 \quad (11)$$

This expands to the following three simultaneous equations as functions of x, y and z:

$$(a-\lambda)x + by + cz = 0$$

$$dx + (e-\lambda)y + fz = 0$$

$$gx + hy + (i-\lambda)z = 0 \quad (12)$$

These equations have an infinite set of solutions including x=y=z=0. If the condition x=y=z=0 is excluded then any remaining valid solution for x, y and z is an Eigen vector (direction) associated with $\lambda$. The original input was a 3×3 covariance matrix and hence there are three values for $\lambda$. Any of the valid solutions for x, y and z associated with the largest value of $\lambda$ is the principal component. The principal component vector is converted to a principal component unit vector by dividing x, y and z by the vector length:

$$\text{length} = \sqrt{x^2 + y^2 + z^2} \quad (13)$$

So, following step 110, the Earth vector and the forwards vector have been determined. These two values are useful in themselves. However, to more completely express the acceleration data in terms of vehicle axes, the sideways vector is determined. The sideways vector is determined at step 112. The sideways vector is a vector which is perpendicular to both the Earth vector and to the forwards vector. This can be determined with the vector cross product as follows:

$$A \times B = \begin{bmatrix} AyBz - ByAz \\ AzBx - BzAx \\ AxBy - BxAy \end{bmatrix} \quad (14)$$

Now the three vectors of the vehicle frame of reference have been determined and are expressed in terms of the accelerometer axes. Axis conversion is achieved by projecting every acceleration measurement relative to the accelerometer axes onto an Earth vector, a forwards vector and a sideways vector. The projections are calculated using the same form as equation (3), namely the projection P of vector A onto vector B is given by:

$$\begin{bmatrix} Px \\ Py \\ Pz \end{bmatrix} = \begin{bmatrix} Bx^2 & BxBy & BxBz \\ ByBx & By^2 & ByBz \\ BzBx & BzBy & Bz^2 \end{bmatrix} \begin{bmatrix} Ax \\ Ay \\ Az \end{bmatrix} \quad (15)$$

If A(x,y,z) is an accelerometer measurement in accelerometer axes, E(x,y,z) is the Earth vector in accelerometer axes, F(x,y,z) is the forwards vector in accelerometer axes, S(x,y,z) is the sideways vector in accelerometer axes, VE is the vehicle Earth acceleration in accelerometer axes, VF is the vehicle forwards acceleration in accelerometer axes and VS is the vehicle sideways acceleration in accelerometer axes, then applying equation (14) gives:

$$\begin{bmatrix} VEx \\ VEy \\ VEz \end{bmatrix} = \begin{bmatrix} Ex^2 & ExEy & ExEz \\ EyEx & Ey^2 & EyEz \\ EzEx & EzEy & Ez^2 \end{bmatrix} \begin{bmatrix} Ax \\ Ay \\ Az \end{bmatrix} \quad (16)$$

$$\begin{bmatrix} VFx \\ VFy \\ VFz \end{bmatrix} = \begin{bmatrix} Fx^2 & FxFy & FxFz \\ FyFx & Fy^2 & FyFz \\ FzFx & FzFy & Fz^2 \end{bmatrix} \begin{bmatrix} Ax \\ Ay \\ Az \end{bmatrix}$$

$$\begin{bmatrix} VSx \\ VSy \\ VSz \end{bmatrix} = \begin{bmatrix} Sx^2 & SxSy & SxSz \\ SySx & Sy^2 & SySz \\ SzSx & SzSy & Sz^2 \end{bmatrix} \begin{bmatrix} Ax \\ Ay \\ Az \end{bmatrix}$$

Figure 3:
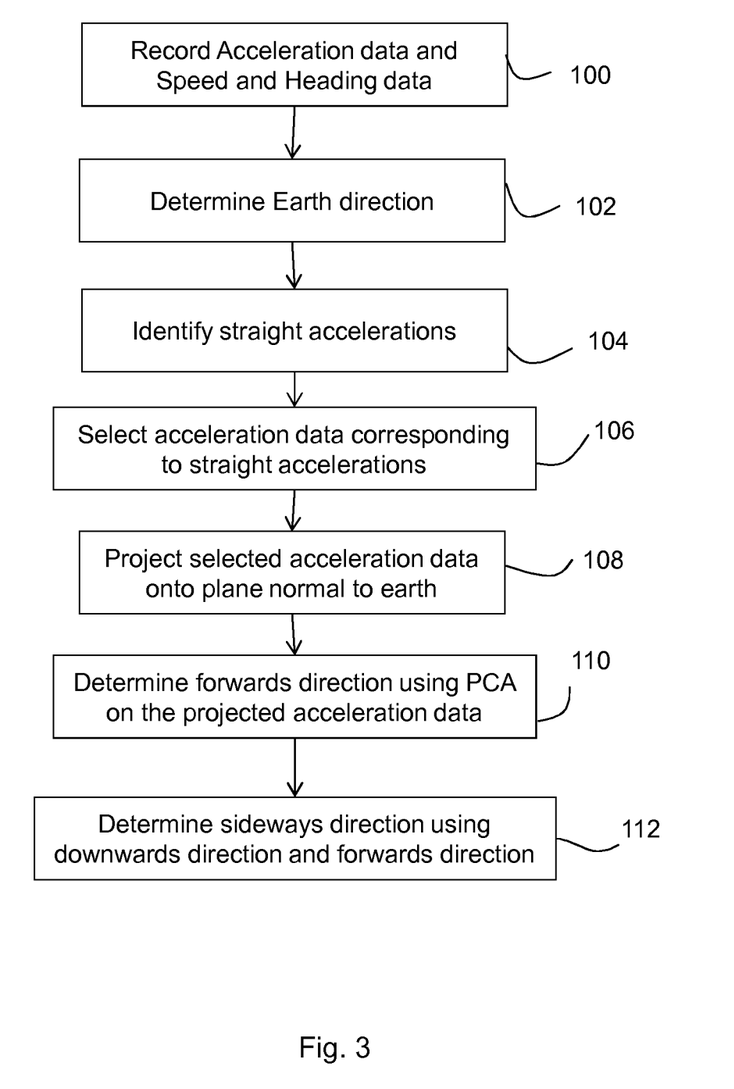
FIG. 3 is a flow chart of processing which can be carried out in one embodiment to determine the orientation of a monitoring apparatus relative to a vehicle.
Figure 4:
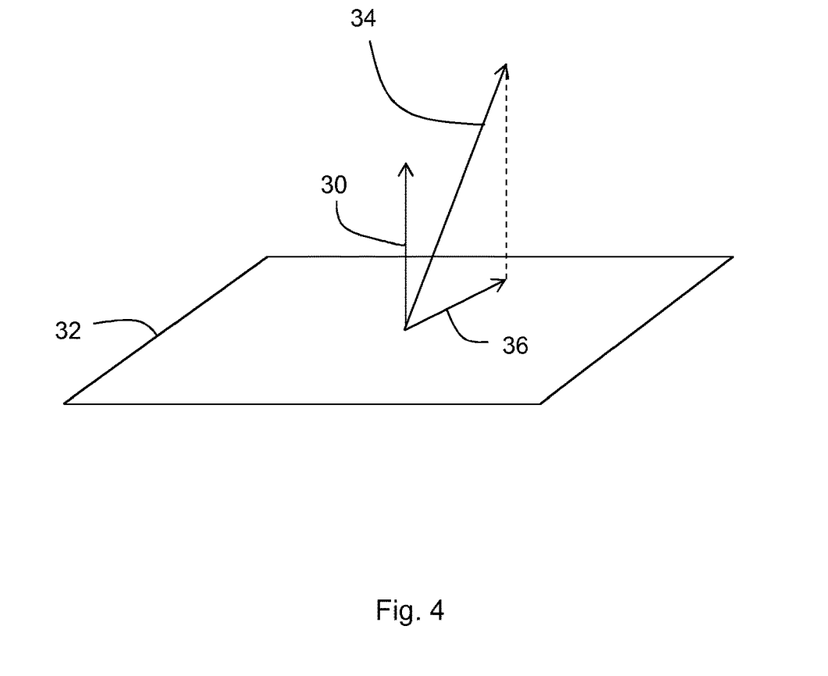
FIG. 4 depicts the concept of projecting vectors onto a plane.

Once the Earth vector, forwards vector and side vector are known from equation (16) accelerometer data can be converted into vehicle axes. The following assumptions are made:

The Earth vector is a unit vector
The forwards vector is a unit vector
The sideways vector is a unit vector
The Earth vector, forwards vector and sideways vector are orthogonal This is case when for example the method of FIG. 3 is followed. Given these assumptions it can be shown that conversion from accelerometer axes Ax, Ay and Az (i.e. the output of the accelerometer) to Earth, Forwards and Sideways axes in the vehicle frame of reference is given by:

$$\begin{bmatrix} Earth \\ Forwards \\ Sideways \end{bmatrix} = \begin{bmatrix} Ex & Ey & Ez \\ Fx & Fy & Fz \\ Sx & Sy & Sz \end{bmatrix} \begin{bmatrix} Ax \\ Ay \\ Az \end{bmatrix} \quad (17)$$

Thus, the conversion requires relatively little processing power. The monitoring apparatus stores $E_{xyz}$, $F_{xyz}$ and $S_{xyz}$ in storage 6 for later use.

This method requires a length of time to pass during which data is recorded before the conversion vectors can be calculated. During periods where no valid conversion vectors are stored in storage 6, no conversion is carried out and the acceleration data is reported in terms of the accelerometer axes. An example of one way in which it can be determined whether conversion should or should not be carried out is as follows: If all three vectors have zero length then axis conversion is disabled. Otherwise, (i.e. if any vector has non-zero length) axis conversion is enabled.

Another embodiment of determining the orientation of the accelerometer uses the same calculations as described above, except that, in the principal component analysis (PCA), both positive accelerations (when speed is increasing) and negative accelerations (when speed is decreasing) are used. The accelerations used in the PCA can therefore be divided into two sub-sets: $p_m^+$ and $p_n^-$, according to whether or not they belong to an interval when the speed is increasing or decreasing.

Some additional steps can then carried out to assess the quality of the results of the PCA and ensure that the sign of the calculated forwards vector is correct. A quality value, Q, is determined using:

$$Q = \frac{\sum_M \text{sgn}(\alpha_m^+) - \sum_N \text{sgn}(\alpha_n^-)}{M + N} \quad (18)$$

where sgn( ) is the signum function. The signum function maps positive values to 1, negative values to −1 and zero values are unchanged. The values $a_m^+$ and $a_n^-$ are the dot products of each vector in the sub-sets $p_m^+$ and $p_n^-$ respectively with the forward vector f resulting from the PCA or:

$$a_m^+ = f p_m^+ \text{ and}$$

$$a_n^- = f p_n^-$$

Q takes on values in the range −1 to +1.

A value of Q=−1 indicates that the direction of the forward vector produced by the PCA is the opposite of the desired value. This can be a consequence of the use of the covariance matrix in the PCA algorithm, which will have the same value if all the samples are negated. Therefore if Q is negative the forward vector, f, is negated to produce a vector which corresponds to the forwards direction. Q is then also negated so that it has a value in the range 0 to +1.

If Q=+1 it indicates that all the acceleration samples used in the estimation had a component in the forward direction whose sign agrees with the change in speed and suggests that f is a good estimate. A value of Q=0 indicates that half the samples agree about the forward direction but half disagree and suggests that f is a bad estimate and should be recalculated with new data or the data set expanded with additional data. In some embodiments a threshold value for Q can be set below which the calculated forward vector f is recalculated. For example the forward vector may be recalculated if Q is less than 0.5, less than 0.75 or less than 0.9. Although Q has been described for embodiments in which positive and negative accelerations are used, it is not limited to those embodiments and can also be used in embodiments in which only positive accelerations are used.

Other embodiments may estimate the accuracy of the forward vector calculated using PCA by comparing it with a forward vector calculated by another method. One such method sums the projected acceleration vectors, taking account of the sign of the speed change, and normalises the result. The two results can be compared by using their dot-product to calculate the angle between them. The vector may be recalculated with additional or different acceleration data when the this angle is greater than, for example, 5 degrees, 10 degrees, 15 degrees, or any other suitable value.

Some embodiments can apply an offset to acceleration data selected when GPS is used to identify periods of straight line acceleration. This can improve accuracy when the output of the GPS has a lag, possibly introduced by the output of speed and heading data at a slower rate than data is available from the accelerometer. For, example an offset of 1 second has been found to improve accuracy of the calculated forward vector when a GPS is used which outputs speed and heading data once a second.

Any offset is subtracted from the straight line acceleration period as identified from the GPS data. So, in an example where the offset is one second, the acceleration samples for the period $(t_1 - 1 \text{ s})$ to $(t_2 - 1 \text{ s})$ are used, where $t_1$ to $t_2$ is the identified period of straight acceleration using the GPS data. This offset can be used in all the methods discussed above where a straight line acceleration is identified using GPS data. In embodiments in which a quality value, Q, is determined, an offset of 1 second has been shown to increase the value of Q significantly.

As the acceleration data will have the same format whether or not conversion has been applied, a mechanism to distinguish between converted and unconverted acceleration data can be provided in some embodiments. For example, acceleration data can be supplemented with a flag to indicate whether conversion has been applied.

In another embodiment, if acceleration data is transmitted to another entity, a different message can be used for converted acceleration data than for unconverted acceleration data. If axis conversion is disabled then the monitoring apparatus generates messages where the accelerometer measurements are in accelerometer axes and this is indicated by a first message type. If axis conversion is enabled then the monitoring apparatus generates messages where the accelerometer measurements are in vehicle axes and this is indicated by a second message type. However, other than the message types (which can be an enumerated variable, for example) the format of the first and second message types is otherwise identical.

As discussed above, the method to determine the orientation of the accelerometer can be performed locally, for example on the monitoring apparatus mounted to the vehicle, or performed remote from the monitoring apparatus. When the method is performed remotely a lower power processor and smaller storage for data can be used in the monitoring apparatus itself.

Figure 6:
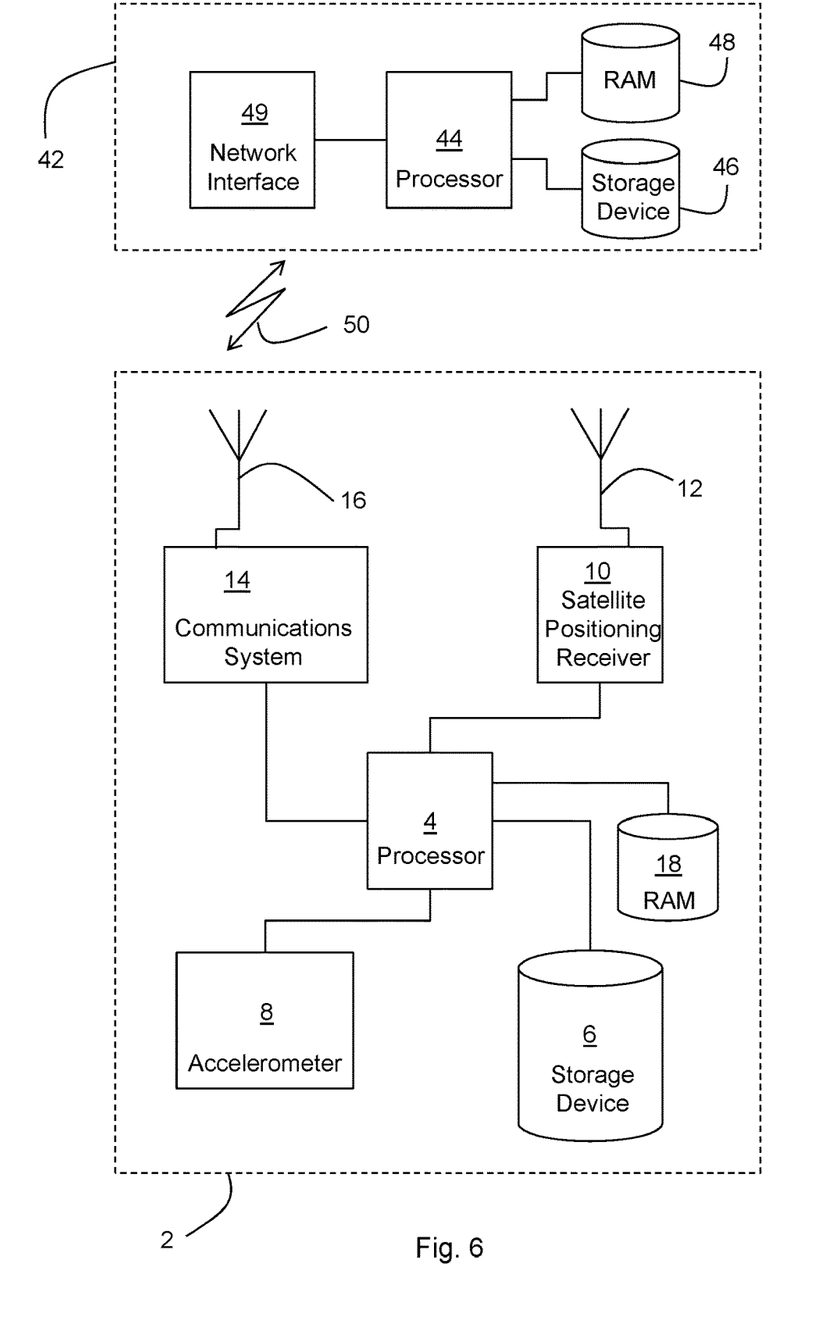
FIG. 6 shows a diagrammatic representation of a system for determining the orientation of a monitoring apparatus relative to a vehicle.

A schematic diagram of an example of a system comprising a monitoring apparatus and a server according to one embodiment is depicted in FIG. 6. The system comprises a monitoring apparatus 2 which is the same as described above with reference to FIG. 1. The system also comprises a server 42 which comprises a processor 44 which is connected to non-volatile storage 46, RAM 48 and network interface 49. Non-volatile storage 46 can store program instructions for execution by the processor and data received from one or more monitoring apparatus 2. Although only one monitoring apparatus 2 is depicted, the server may be in communication with more than one monitoring apparatus.

The network interface can be any form of interface which allows transmission and reception of data for communication between the server 42 and the monitoring apparatus 2. For example it may be an interface conforming to the IEEE 802.11 family of standards. In other embodiments the interface may conform to other standards, such as the GSM standard or 3GPP standards discussed above with reference to the wireless communication system of the monitoring apparatus 2.

A network, denoted in general by arrow 50, routes messages to and from the server 42 and the monitoring apparatus 2 through the network interface 49 and the wireless communication interface 14. The network may be a single network (for example a single GSM operator's network) or may be a number of interconnected networks including bridges (not shown) to convert from one network protocol to the other.

In this embodiment, the method for determining the orientation of the monitoring apparatus is carried out by the processor 44 of the server 42. For example, the processor 44 carries out computer implementable instructions stored in the non-volatile storage 46 to implement the method. The processor 44 can be triggered to carry out the method by a number of factors. For example, the method may be executed because no orientation has been determined for a particular monitoring apparatus or a particular accelerometer. This might be the case when a monitoring apparatus or accelerometer is newly installed. In another example, the method is triggered to be carried out again for a device when the orientation has been previously determined. This might be the case where the orientation changes after initial installation, for example if the device is moved during maintenance or otherwise changes orientation relative to the vehicle over time. Reduced accuracy data may be determined from the data itself, for example showing larger than expected or smaller than expected forwards or sideways accelerations or by a downwards acceleration which does not substantially equal gravity.

Figure 7:
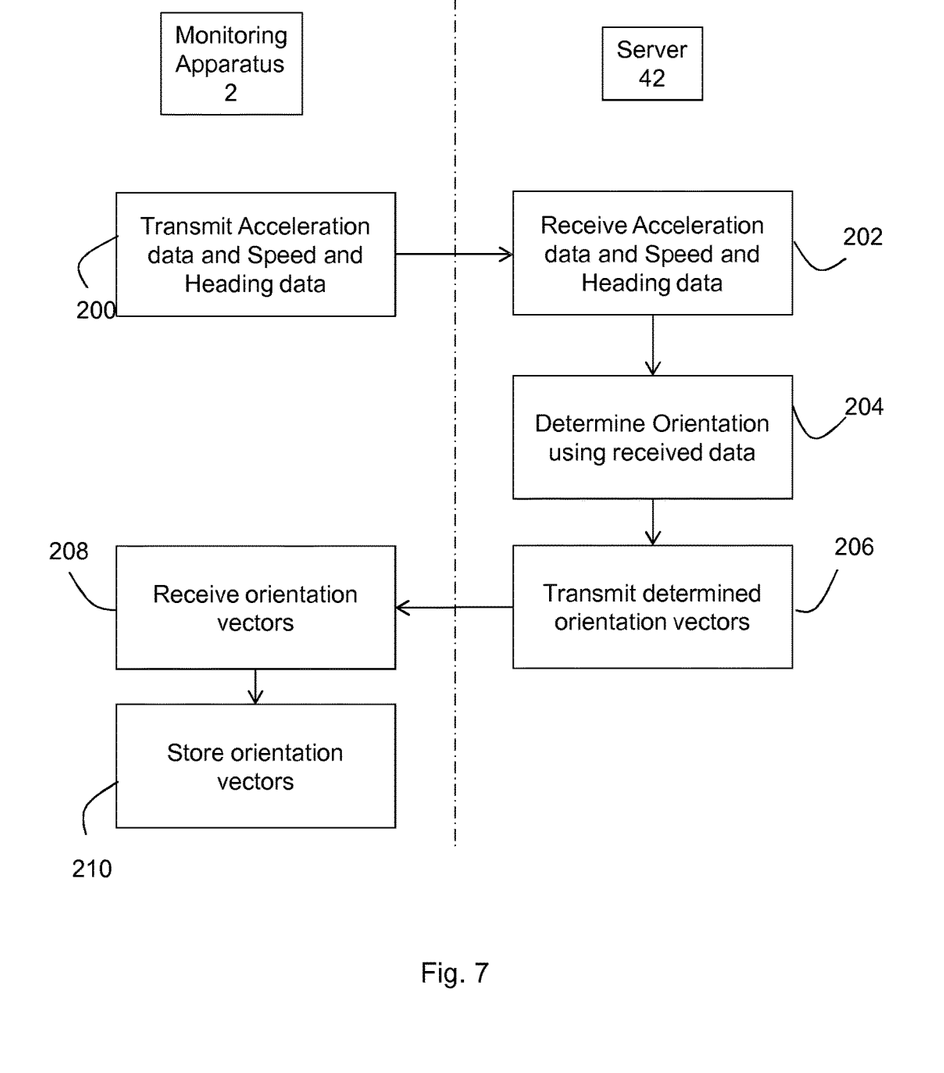
FIG. 7 is a signal flow diagram for the processing of one embodiment using the system of FIG. 6.

FIG. 7 illustrates the signal flows that can be used to determine the orientation in the embodiment of FIG. 6 when the orientation has not previously been calculated. First at step 200, the monitoring apparatus 2 transmits acceleration data and speed and heading data to the server 42, which is received at step 202. As no orientation data is stored in the monitoring apparatus 2, this data is transmitted without conversion and is the data output by the accelerometer 8. To reduce network traffic the monitoring apparatus 2 may buffer the data before transmission and transmit more than one acceleration and speed and heading measurement to the server at once. For example, the monitoring apparatus 2 may buffer approximately 10 seconds, approximately 20 seconds, or some other time period of data before transmitting to the server 42.

When the server 42 receives the data at step 202, it is determined whether enough data has been received to calculate the orientation. For example it can be checked whether data for a minimum distance of travel has been received. If there is not enough data the server continues to receive data until enough has been received to calculate the orientation.

Once enough data has been received, execution proceeds to step 204, where the orientation is determined using the received data. For example orientation can be calculated using the method described above with reference to FIG. 3 from step 102 onwards.

At step 206 the determined orientation vectors are transmitted to the monitoring apparatus 2. They are received at step 208 and stored in non-volatile memory of the monitoring apparatus 2 at step 210. Before being stored the validity of the received orientation vectors is checked to determine that they are valid. If there are any inconsistencies (for example the orientation vectors are not unit vectors, or the orientation vectors are not orthogonal) then the vectors are not stored.

Once data has been stored the monitoring apparatus then converts the accelerometer data into the frame of reference of the vehicle axes as described above using equation (17). The message type is changed to indicate that the acceleration data is in terms of vehicle axes.

Should the server calculate updated orientation data, that can be transmitted to the monitoring apparatus where it will replace existing orientation data. Thus it is not necessary to delete or remove the orientation data in the monitoring apparatus while the server is gathering data for a recalculation.

The use of a separate server allows flexibility in the calculation of the orientation vectors. A server will typically have sufficient storage capacity to store large amounts of acceleration data. Thus, the orientation data can be recalculated and/or refined as more data is received at the server. If it is thought that the orientation is no longer accurate, for example because the monitoring apparatus has moved relative to the vehicle, a server-based implementation has flexibility over when and how it recalculates. In one embodiment the server may gather data from the time acceleration data in vehicle axes is determined as inaccurate and then recalculate. Alternatively, if it is assumed the data has been inaccurate for some time, data immediately preceding when the data is determined as inaccurate can be used (this can be converted back to raw accelerometer data because the orientation vectors are known).

A server based implementation can also update the orientation determination algorithm without needing to update the monitoring apparatus or implement different criteria for different monitoring apparatuses. For example a monitoring apparatus for one customer may have its orientation calculated after a different distance than another monitoring apparatus for another customer.

All requests to modify the conversion vectors using over-the-air parameter block updates are validated by the parameter block module. Any inconsistencies (not unit lengths, not orthogonal) are rejected.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of determining the orientation, relative to a vehicle, of a monitoring apparatus attached to the vehicle, the method comprising:
   periodically recording, by the monitoring apparatus, acceleration data of the monitoring apparatus along three mutually orthogonal axes at a first time interval;
   periodically recording, by the monitoring apparatus, speed and heading data of the apparatus at a second time interval;
   transmitting, by the monitoring apparatus, the acceleration data and the speed and heading data to a server;
   receiving, by the server, the acceleration data and the speed and heading data;
   determining, by the server, a first vector which corresponds to the direction of gravity using the acceleration data;
   identifying, by the server, one or more periods of acceleration in a substantially straight line using the speed and heading data;
   selecting, by the server, acceleration data corresponding to the identified one or more periods of acceleration in a substantially straight line;
   determining, by the server, a second vector which is orthogonal to the first vector and which corresponds to a forward direction of the vehicle using the selected acceleration data;
   transmitting, by the server, the first vector and the second vector to the monitoring apparatus;
   storing, by the monitoring apparatus, the first vector and the second vector in a memory of the monitoring apparatus; and
   converting, by the monitoring apparatus, subsequent acceleration data into a vehicle frame of reference using the first vector and the second vector.

2. The method of claim 1, wherein the determining the second vector comprises:
   projecting, by the server, the selected acceleration data onto a plane normal to the first vector; and
   using, by the server, principal components analysis to determine a principal component vector of the projected selected acceleration data, wherein the second vector is the principal component vector.

3. The method of claim 2, comprising calculating, by the server, a quality value as an indicator of the accuracy of the second vector, wherein the calculation of the quality value uses the dot product of the second vector with the projected values of the selected acceleration data on the plane normal to the first vector.

4. The method of claim 1, wherein the speed and heading data is from a satellite positioning system receiver.

5. The method of claim 4, comprising:
   applying, by the server, a time offset to the one or more periods of acceleration in a substantially straight line before the selecting acceleration data corresponding to the one or more periods of acceleration in a substantially straight line.

6. The method of claim 1, wherein the recording acceleration data and the recording speed and heading data is carried out until the vehicle has travelled at least 1 km before the determining a first vector and a second vector.

7. A system comprising:
   a server comprising memory, a network interface and a processor, wherein the processor is configured to:
      receive and store acceleration data of a monitoring apparatus along three mutually orthogonal axes periodically at a first time interval, the monitoring apparatus being attached to a vehicle and remote from the server;
      receive and store speed and heading data of the monitoring apparatus periodically at a second time interval;

determine a first vector which corresponds to the direction of gravity relative to the vehicle using the acceleration data;

identify one or more periods of acceleration in a substantially straight line using the speed and heading data;

select acceleration data corresponding to the identified one or more periods of acceleration in a substantially straight line;

determine a second vector which is orthogonal to the first vector and which corresponds to a forward direction of the vehicle using the selected acceleration data;

transmit the first vector and the second vector to the monitoring apparatus; and cause the monitoring apparatus to use the first vector and the second vector to convert subsequent acceleration data into a vehicle frame of reference.

8. The system of claim 7, wherein the processor is configured to determine the second vector by:

projecting the selected acceleration data onto a plane normal to the first vector; and using principal components analysis to determine a principal component vector of the projected selected acceleration data, wherein the second vector is the principal component vector.

9. The system of claim 8, wherein the processor is configured to calculate a quality value as an indicator of the accuracy of the second vector, wherein the calculation of the quality value uses the dot product of the second vector with the projected values of the selected acceleration data on the plane normal to the first vector.

10. The system of claim 7, wherein the processor is configured to record acceleration data and to record speed and heading data until the vehicle has travelled at least 1 km before determining the first or second vector.

11. The system of claim 7, further comprising a monitoring apparatus attached to a vehicle and wherein the monitoring apparatus comprises:

an accelerometer interface for the acceleration data; and a positioning and heading interface for the speed and heading data.

12. The system of claim 11, wherein the monitoring apparatus comprises a satellite positioning receiver connected to the positioning interface.

13. A non-transitory computer-readable storage medium comprising computer-executable instructions which, when executed by a processor, cause a computing device to perform a method of determining the orientation, relative to a vehicle, of a monitoring apparatus remote from the computing device and attached to a vehicle, the method comprising:

periodically recording received acceleration data of the monitoring apparatus along three mutually orthogonal axes at a first time interval;

periodically recording received speed and heading data of the monitoring apparatus at a second time interval;

determining a first vector which corresponds to the direction of gravity using the acceleration data;

identifying one or more periods of acceleration in a substantially straight line using the speed and heading data;

selecting acceleration data corresponding to the identified one or more periods of acceleration in a substantially straight line;

determining a second vector which is orthogonal to the first vector and which corresponds to a forward direction of the vehicle using the selected acceleration data transmitting the first vector and the second vector to the monitoring apparatus; and causing the monitoring apparatus to use the first vector and the second vector to convert subsequent acceleration data into a vehicle frame of reference.

14. The non-transitory computer-readable storage medium of claim 13, comprising computer-executable instructions which, when executed by the processor cause the computing device to determine the second vector using a method comprising:

projecting the selected acceleration data onto a plane normal to the first vector; and using principal components analysis to determine a principal component vector of the projected selected acceleration data, wherein the second vector is the principal component vector.

15. The non-transitory computer-readable storage medium of claim 14, comprising computer-executable instructions which, when executed by the processor cause the computing device to calculate a quality value as an indicator of the accuracy of the second vector, wherein the calculation of the quality value uses the dot product of the second vector with the projected values of the selected acceleration data on the plane normal to the first vector.

16. The non-transitory computer-readable storage medium of claim 13, wherein the speed and heading data is from a satellite positioning system receiver.

* * * * *